United States Patent Office 3,449,139
Patented June 10, 1969

---

3,449,139
SUBTERRANEAN CONSOLIDATION
SILICATE CEMENT
David A. Kuhn, Wyckoff, N.J., assignor to Continental Oil Company, Ponca City, Okla., a corporation of Delaware
No Drawing. Filed Sept. 12, 1966, Ser. No. 578,513
Int. Cl. C04b 19/00; C09d 1/02
U.S. Cl. 106—84                    10 Claims

ABSTRACT OF THE DISCLOSURE

A halogenated alcohol or thiol is incorporated into a conventional alkali silicate permeable cement to improve the resistivity of such cement to water degradation.

---

This invention relates to the well completion method of consolidating subterranean formations traversed by vertical well bores and compositions for use in accomplishing these methods. More particularly, this invention is directed to a method of completion and a water resistant composition of siliceous cement having the normal attributes of a cement, together with a high degree of permeability upon setting which is achievable at formation temperatures in a reasonable time. In one aspect, this invention relates to a water resistant composition of such a siliceous cement suitable as a filter media.

The drilling of well bores into formations of subterranean reservoirs for the purpose of recovering the fluids contained therein such as oil and gas often entails the necessity of obtaining these fluids from such formations which are incompetent. These formations are often rather incompetent due to the fact that the particles of the formation are so unconsolidated that the naturally occurring materials within the formation such as sand particles are produced into the well bore to such an extent that production becomes inhibited due to the flow of such materials.

Until about 1960 the chief means for controlling the undesirable separation and movement of unconsolidated particles during production operations was by such mechanical devices as screens, filters, liners, chokes, etc.; however, such means were never completely satisfactory.

In 1960, Robert L. Mann developed a permeable cement which broadly comprised a stable suspension of siliceous cement consisting essentially of a sodium silicate, a finely divided solid suspending agent, a siliceous aggregate, water and a stabilizing agent, said suspeension forming a permeable siliceous cement composition upon setting. A patent application was filed in December of 1960 which matured into Patent 3,146,828 in September 1964. A companion patent to the same inventor (U.S. 3,146,-829) discloses and claims an improvement.

The above patents went a long way in solving the unconsolidated sand problems; however, after a number of years' experience, it was noted that water tended to break down the siliceous cement apparently attacking the water soluble sodium silicate. Since it is well known that in many wells, water is produced along with the oil or gas, this has been a problem with the cements of the aforesaid patents.

It is an object of this invention to provide a method of stabilizing an alkali metal silicate cement against water degradation.

Other objects, features and advantages of this invention will be obvious to those skilled in the art upon being given this specification and the accompanying claims.

Broadly, the objects of this invention are accomplished by incorporating a halide of an alcohol or thiol into a sodium silicate permeable cementing composition.

As has been stated, this invention is directed to an improvement over the prior art siliceous permeable cements as exemplified in the two Mann patents, supra. In general, the basic ingredients of these systems are sand, soluble alkali silicate (particularly sodium silicate) and water. These cements can contain additional materials to improve setability, crushing strength and the like. Such materials include fatty acids, amides and esters, zinc oxide, sodium fluosilicate, sodium bicarbonate, carbon dioxide and the like. The details of specified preferred ratios are adequately disclosed by the prior art and are no part of the invention except to the extent that the additive of this invention is applicable to all such cements.

As also has been stated, these cements are widely used in unconsolidated sand formations for well completion and also have been found useful in maintaining a fracture open by pumping a slurry of such cement under pressure into an artificial fracture in an oil or gas formation, all of which is described in the aforesaid Mann patent.

The haloalcohols useful in this invention are those haloalcohols which are water soluble. The term alcohol is intended to include aliphatic primary, secondary and tertiary alcohols and polyols. These alcohols can be slightly branched, preferably having not more than 2 carbon atoms in any branch chain. Alcohol also includes thiols. Again, these alcohols can be branched and, preferably, will contain not more than 2 carbon atoms in such branches or substituents on the aromatic ring.

The halogen can be bromine or iodine but will preferably be chlorine. The halogen can be in any position in the alcohol structure; however, I particularly prefer aliphatic 1-ols of 2 to 5 carbon atoms with the halogen being on the carbon atom furthest from the carbon atom attached to the —OH radical. Thus, inclusive of, but not restricted to, the preferred compounds of this invention are 2-chloroethanol, 3-iodopropanol, 4-chlorobutanol, 5-bromopentanol, 4-choloro-3 ethylbutanol, 5-bromo-3 methylhexanol and the like.

Inclusive of, but not limited to, the less preferred compounds are 4-chlorobutanol-2; 4-bromo-3-chloro-pentanol-2; 2,2-dichloro-3 methylpentanol-3; 1-chloro-3-methylbutanol-2; 3-chloro-1,6 propanediol; 2-chloroethylthiol; 4-bromobutyl-thiol and the like.

The amount of these haloalcohols useful will depend upon the particular compound being used. Thus, in a typical formulation one could use 10 to 250 cc. of the alcohol per 100 cc. of water. Preferably, one would use 75 to 100 cc. of alcohol per 100 cc. of water. As described in the two Mann patents, the amount of water used will depend upon the particular formulation but, in any case, will be enough to produce a pumpable slurry.

While I do not intend to be bound by any theory, it is believed that upon hydrolysis these haloalcohols slowly yield the corresponding haloacid which reacts with the sodium silicate to form a strong, water resistant gel. The permeability is obtained when the gel shrinks around the sand grains, forming a bond among them. Thus, for the first time, the setting of such cements can be initiated by slow release of a strong acid slowly reducing the pH to nearly neutral. Direct addition of a strong acid has the disadvantage of flash setting or quick setting the slurry making the pumping and placement difficult, if not impossible.

EXAMPLE

To further illustrate the invention, a permeable cement was prepared with the following composition:

| | |
|---|---|
| 1:3.22—$Na_2O:SiO_2$ | grams__ 60 |
| 1:2.0—$Na_2O:S_1O_2$ | do____ 120 |
| Sand—80–200 mesh size | do____ 700 |
| $H_2O$ | cc__ 175 |
| ZnO | grams__ 25 |

Additive mol, e.g., of 115 cc.—2-chloroethanol.

Test batches of permeable cement were prepared for each composition and the cement cured at 140° F. for six days. Each batch was cured at six points and cut into ⅞-inch lengths of ⅞-inch diameter. The cores were divided into three equal groups with at least one core from each portion of the original mold in each group. All cores were placed in diesel fuel to cure at 140° F. The cores were then taken from the diesel fuel and flushed with water at 140° F. The data are given in the table.

TABLE

| Setting agent | Average permeability, md. | Average crushing strength, p.s.i. | Retained strength | |
|---|---|---|---|---|
| | | | 10 liters flow, percent | 100 liters flow, percent |
| Acetamide | 2,577 | 1,836 | 30.5 | 4.2 |
| Do | 3,147 | 1,765 | 30.8 | 3.5 |
| Do | 4,106 | 1,740 | 41.0 | 6.0 |
| Do | 4,126 | 1,747 | 60.0 | 9.3 |
| Do | 3,093 | 1,199 | 52.5 | 16.8 |
| Do | 5,429 | 1,244 | 56.5 | 16.7 |
| 2-chloroethanol | 7,789 | 1,131 | 120 | 89.5 |
| Do | 9,711 | 1,868 | 79.1 | 93.0 |
| Do | 15,215 | 1,345 | 94.9 | 108 |
| Do | 12,206 | 1,360 | 98.1 | 64.0 |
| 4-Chlorobutanol | 259 | 1,661 | 80.7 | ¹ 38.2 |
| Do | 3,749 | 1,836 | 78.6 | 69.3 |

¹ At 404 liters flow.

From the table it can readily be seen that the halogenated alcohols are far superior to water deterioration than was the cement utilizing acetamide, the most widely used material of the prior art for promoting setting of the alkali silicate cements.

Having thus described the invention, I claim:

1. In the preparation of a permeable cement suitable for subterranean consolidation and comprising an alkali silicate, sand and water, the improvement comprising incorporating in the cement slurry 10 to 250 cc. per 100 cc. of water in said slurry, a halogen containing material selected from the group consisting of halogenated primary, secondary and tertiary mono- and di-hydroxy alcohols and mono thiols.

2. The improvement of claim 1 wherein the halogenated alcohol is an aliphatic alcohol.

3. The improvement of claim 2 wherein the alcohol is a mono-1-ol.

4. The improvement of claim 3 wherein the halogen is chlorine.

5. The improvement of claim 1 wherein the halogenated alcohol is 2-chloroethanol.

6. The improvement of claim 1 wherein the halogenated alcohol is 4-chlorobutanol.

7. A composition of matter consisting essentially of water, sand, ZnO, an alkali silicate and 10 to 250 cc. per 100 cc. of said water of a halogen containing material selected from the group consisting of halogenated primary, secondary and tertiary mono- and dihydroxy alcohols and mono thiols.

8. The composition of claim 7 wherein the alkali silicate is sodium silicate, and the halogenated alcohol is a halogenated aliphatic mono-1-ol.

9. The composition of claim 8 wherein the halogenated alcohol is 2-chloroethanol.

10. The composition of claim 8 wherein the halogenated alcohol is 4-chlorobutanol.

References Cited

UNITED STATES PATENTS 3,146,828   9/1964   Mann _____ 106—84

FOREIGN PATENTS 865,244   4/1961   Great Britain.

JAMES E. POER, *Primary Examiner.*